No. 647,519. Patented Apr. 17, 1900.
F. A. POUPARD.
HORSESHOE.
(Application filed Nov. 22, 1898.)
(No Model.)
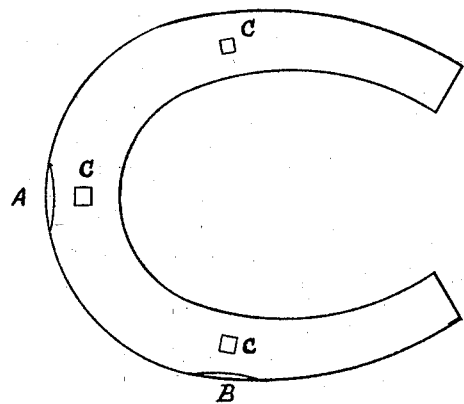
Fig. 1.
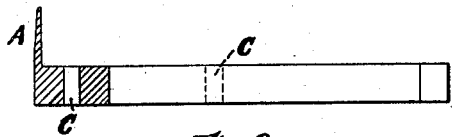
Fig. 2.
  
Fig. 3. Fig. 4. Fig. 6.
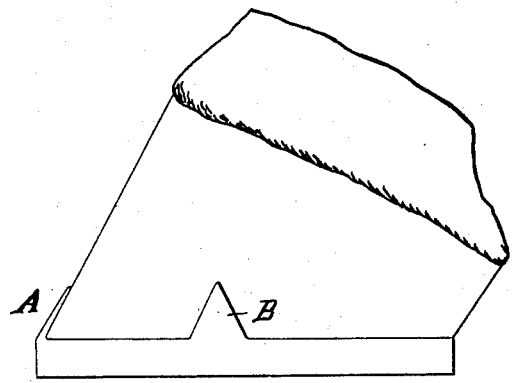
Fig. 5.
Witnesses:
E. B. Bolton
Inventor:
Frederick Abraham Poupard
By 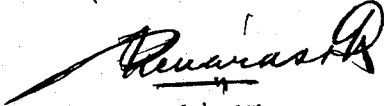
his Attorneys.
THE NORRIS PETERS CO., PHOTO-LITHO., WASHINGTON, D. C.

UNITED STATES PATENT OFFICE.

FREDERICK ABRAHAM POUPARD, OF LONDON, ENGLAND.

HORSESHOE.

SPECIFICATION forming part of Letters Patent No. 647,519, dated April 17, 1900.

Application filed November 22, 1898. Serial No. 697,159. (No model.)

*To all whom it may concern:*

Be it known that I, FREDERICK ABRAHAM POUPARD, a subject of the Queen of Great Britain and Ireland, and a resident of West Norwood, London, in the county of Surrey, England, have invented certain new and useful Improvements in Horseshoes, of which the following is a full, clear, and exact specification.

This invention relates to horseshoes attachable to the hoofs of horses or other hoofed animals without the use of nails piercing the outer horn of the hoof or of straps.

Figure 1 is a plan, and Fig. 2 is a section, of my improved shoe as adapted for fitting and shaping to the hoof. Figs. 3 and 4 are two side elevations of short chisel-edged studs to be secured in the tread of the shoe after it has been fitted to the hoof. Fig. 5 is an outside elevation of the shoe as fitted to the hoof. Fig. 6 shows the mode of clenching the stud into the shoe.

After many years' trial and experience I have found that a shoe to be attached without nails securely to the hoof of a horse or similar hoofed animal without injury to the hoof or foot and with security against detachment by the horse or by the most severe work must fulfil the following conditions: First, the grip of the shoe to the hoof without piercing or injuring the outer wall of the hoof must be on the hard outer shell of the hoof; second, it must be upon the front half-circumference of the hoof, so that the cartilaginous part of the heel may be free to elastically expand and contract under the pressure of the tread; third, that there should be no protruding excresence of the shoe attachment on the wall of the hoof toward the adjoining leg, so that one hoof and shoe cannot strike against or be placed upon the attachment of the adjoining shoe, and, fourth, the shoe must be adaptable so as to be closely laid upon and fitted to the hoof without tread projections before it is attached. These conditions, which are not fulfilled by any nailless shoe extant, leave only the outer quarter-circumference or quadrant of the hoof from the toe to the point of largest transverse diameter as the area on which any external clip can be applied and the front semicircumference from point to point of the largest transverse diameter in which sole-studs may be applied to prevent side shipping, and these studs may not be in position until after the shoe has been fitted to the hoof. My improved shoe fulfils these conditions, and any departure from the above conditions will render a nailless shoe unreliable as to its security of attachment, injurious to the foot of the animal, or incapable of being readily fitted to the hoof and easily attached by unskilled labor.

To carry my invention into effect, my shoe is made, as shown in Figs. 1 and 2, with an external upright malleable clip A at the extreme edge of the toe of the shoe and a similar upright malleable clip B on the outer edge of the shoe relatively to the adjoining leg and at the point of greatest transverse diameter of the hoof. It is useless and injurious to the animal to attempt to apply external clips rearward of this point—useless because rearward of that point the wall of the hoof becomes vertical or overhanging outward and no grip can be obtained upon the hoof, and injurious to the animal as tending to compress and prevent the elastic lateral play of the cartilaginous substance of the heel of the hoof. I also pierce three holes in the tread of the shoe, C C C, one at the toe and the others upon the largest transverse diameter of the shoe or hoof, thus leaving the heel of the hoof free to elastically play. The shoe is (in this condition) carefully fitted to the hoof to follow its contour, as a badly-fitted or overhanging shoe is hurtful to the horse and liable to be detached by the shoe of the adjoining leg or by external entanglements. The two clips A and B being vertical and the hoof at these points coned inward and the tread of the shoe being clear, no obstruction in my shoe is offered to the accurate fitting by trial of the shoe to the hoof before attachment. When perfectly fitted, short studs D, with chisel-points, are dropped or driven into the holes C C down to the under shoulder of the stud, the neck of the stud entering the shoe, so as to be slightly below the level of the shoe and offering recessed shoulders, over one or both of which the edge of the hole in the shoe may be clenched by a blunt chisel to sufficiently secure the stud in the shoe, as shown at E, Fig. 6. The shoe is now ready for attachment. The short studs are caused to enter into the under face of the hoof by a sharp tap of the hammer on the shoe or even by the pressure of the hoof of the horse upon the shoe when placed in position under the hoof of the standing horse, and the malleable clips A B are then bent over upon the outer face of the hoof at the toe and the outer flank by the tap of a hammer or by pressure and the shoe is firmly affixed and cannot be detached by any wear or by the action of the horse in any way.

Having now described my said invention, be it known that what I claim, and desire to secure by Letters Patent, is—

1. In combination in a nailless horseshoe, a clip at the front, a clip at the side at the point of the largest transverse diameter of the shoe, a chisel-headed stud opposite the inner face of each of the said clips, the inner edge of the shoe being free from clips but having a chisel-headed stud at the point of largest diameter, said front and outer clips being adapted when bent inwardly to clamp a dovetailed portion of the hard shell between themselves and the studs, substantially as described.

2. A stud for horseshoes, having a chisel-pointed head and a shank, said head being of a length to extend beyond the end faces of the shank forming square under shoulders to overlie the surface of the shoe and said shank being of greater width than that of the head to present upper shoulders at a slight distance below the under shoulders, substantially as described.

3. In combination, the horseshoe having an opening therein, a stud having chisel-point of greater length than the opening so as to form under shoulders resting upon the upper surface of the shoe and having a neck provided with lateral shoulders facing upwardly with a slight distance between the planes of the upper and lower shoulders, the edges of the shoe about the opening being clenched over the upper faced shoulder, substantially as described.

4. In combination in a nailless horseshoe, a clip at the front, a clip at the side at the point of the largest transverse diameter of the shoe, a chisel-headed stud opposite the inner face of each of the said clips, the inner edge of the shoe being free from clips but having a chisel-headed stud at the point of largest diameter, said front and outer clips being adapted when bent inwardly to clamp a dovetailed portion of the hard shell between themselves and the studs, said studs having square shanks engaging square holes in the shoe and preventing turning, substantially as described.

In witness whereof I have hereunto set my hand in presence of two witnesses.

FREDERICK ABRAHAM POUPARD.

Witnesses:
RICHARD A. HOFFMANN,
CHARLES CARTER.